United States Patent
Dowe et al.

(10) Patent No.: US 9,574,700 B2
(45) Date of Patent: Feb. 21, 2017

(54) METHOD OF PRODUCING AN UNDERGROUND PIPELINE

(75) Inventors: Andreas Dowe, Borken (DE); Rainer Goering, Borken (DE); Martin Risthaus, Dorsten (DE); Klaus Gahlmann, Marl (DE); Reinhard Buessing, Herdecke (DE); Hans-Juergen Kocks, Freudenberg (DE); Joern Winkels, Werl (DE)

(73) Assignees: Evonik Degussa GmbH, Essen (DE); Salzgitter Mannesmann Line Pipe GmbH, Siegen (DE)

( * ) Notice: Subject to any disclaimer, the term of this patent is extended or adjusted under 35 U.S.C. 154(b) by 795 days.

(21) Appl. No.: 12/675,122

(22) PCT Filed: Aug. 27, 2008

(86) PCT No.: PCT/EP2008/061216
§ 371 (c)(1),
(2), (4) Date: Feb. 25, 2010

(87) PCT Pub. No.: WO2009/027429
PCT Pub. Date: Mar. 5, 2009

(65) Prior Publication Data
US 2010/0300572 A1  Dec. 2, 2010

(30) Foreign Application Priority Data

Aug. 29, 2007 (DE) .................. 10 2007 040 683

(51) Int. Cl.
*F16L 58/10* (2006.01)
*F16L 1/028* (2006.01)

(52) U.S. Cl.
CPC .............. *F16L 58/109* (2013.01); *F16L 1/028* (2013.01)

(58) Field of Classification Search
None
See application file for complete search history.

(56) References Cited

U.S. PATENT DOCUMENTS

| | | | |
|---|---|---|---|
| 4,640,313 A * | 2/1987 | Stanley | 138/141 |
| 5,173,009 A * | 12/1992 | Moriarty | F16L 55/1658 138/97 |
| 5,289,561 A * | 2/1994 | Costa Filho | 392/478 |
| 5,565,051 A | 10/1996 | Marzola et al. | |
| 6,030,672 A | 2/2000 | Usui | |
| 6,500,554 B2 | 12/2002 | Gahlmann et al. | |
| 6,500,565 B2 | 12/2002 | Usui | |
| 6,531,019 B2 * | 3/2003 | Usui | 156/244.13 |
| 6,677,015 B2 | 1/2004 | Himmelmann et al. | |
| 6,976,510 B2 | 12/2005 | Campagna et al. | |
| 2001/0023537 A1 | 9/2001 | Gahlmann et al. | |
| 2001/0031323 A1* | 10/2001 | Song | 428/34.5 |
| 2002/0066491 A1* | 6/2002 | Lively | 138/149 |
| 2003/0220449 A1 | 11/2003 | Jacques et al. | |
| 2005/0038201 A1 | 2/2005 | Wursche et al. | |
| 2006/0182916 A1 | 8/2006 | Dowe et al. | |
| 2006/0183869 A1* | 8/2006 | Dowe et al. | 525/340 |
| 2007/0036998 A1 | 2/2007 | Dowe et al. | |
| 2007/0053749 A1* | 3/2007 | Jarvis et al. | 405/154.1 |
| 2010/0009106 A1 | 1/2010 | Dowe et al. | |
| 2010/0300572 A1 | 12/2010 | Dowe et al. | |
| 2010/0300573 A1 | 12/2010 | Dowe et al. | |
| 2011/0209768 A1 | 9/2011 | Dowe et al. | |
| 2012/0006465 A1 | 1/2012 | Dowe et al. | |

FOREIGN PATENT DOCUMENTS

| | | |
|---|---|---|
| CN | 1324719 A | 12/2001 |
| EP | 0 220 122 A1 | 4/1987 |
| EP | 220122 * | 4/1987 |
| EP | 0 768 488 A2 | 4/1997 |
| EP | 1 635 098 | 3/2006 |
| JP | 6-246811 * | 9/1994 |
| JP | 6-246811 A | 9/1994 |
| JP | 8-294994 A | 11/1996 |
| JP | 9-12648 A | 1/1997 |
| JP | 2003-305804 A | 10/2003 |
| JP | 2006-225660 A | 8/2006 |
| RU | 2 088 404 C1 | 8/1997 |
| RU | 2 153 982 C1 | 8/2000 |
| WO | 94 17324 | 8/1994 |
| WO | 2005 031109 | 4/2005 |

OTHER PUBLICATIONS

English Machine Translation of JP 6-246811 From http://www.ipdl.inpit.go.jp/homepg_e.ipdl.*
U.S. Appl. No. 13/202,338, filed Aug. 19, 2011, Dowe, et al.
U.S. Appl. No. 13/063,134, filed Mar. 9, 2011, Dowe, et al.
U.S. Appl. No. 13/443,453, filed Apr. 10, 2012, Hartmann, et al.
U.S. Appl. No. 13/463,061, filed May 3, 2012, Goering et al.
U.S. Appl. No. 13/640,552, filed Oct. 11, 2012, Kuhmann, et al.
U.S. Appl. No. 13/639,765, filed Oct. 5, 2012, Kuhmann et al.
U.S. Appl. No. 13/640,679, filed Oct. 11, 2012, Kuhmann, et al.
U.S. Appl. No. 13/640,586, filed Oct. 11, 2012, Kuhmann et al.
Chinese Office Action Issued Sep. 25, 2009 in Patent Application No. 2008101714111 (English translation only).
German Office Action Issued Aug. 23, 2011 in Patent Application No. 2010 00376.
U.S. Appl. No. 13/872,226, filed Apr. 29, 2013, Berger et al.

* cited by examiner

*Primary Examiner* — Edmund Lee
(74) *Attorney, Agent, or Firm* — Oblon, McClelland, Maier & Neustadt, L.L.P.

(57) ABSTRACT

A pipeline laid trenchlessly and/or without a sand bed is produced using a metallic conduit which is encased with an extruded layer of a polyamide molding material. In this way, the durability of the outer shell required for trenchless laying techniques without a sand bed is ensured.

26 Claims, No Drawings

METHOD OF PRODUCING AN UNDERGROUND PIPELINE

The invention relates to the use of a metallic conduit whose surface is encased with a polyamide layer for producing a pipeline laid trenchlessly or without a sand bed, and to the pipeline produced in this manner.

Supply, disposal or product lines made of metal are currently encased, for example, with a polyolefin, for example polyethylene or polypropylene (WO 2002/094922; US 2002/0066491; EP-A-0346101). The coatings or casings serve primarily for corrosion protection; they are described by corresponding standards. For the polyolefin casings, these are, for example, DIN EN 10288 and DIN EN 30678. In the case of polyolefin encasing, this layer is produced, for example, by means of pipe extrusion or winding extrusion. To promote adhesion, epoxy and adhesive layers can be applied in succession before the extrusion.

Another aspect of the art which is regulated by DIN EN 10310 (German version EN 10310:2003) envisages the coating of steel tubes for earth- and water-laid pipelines by means of polyamide powder. The polyamide coating is applied by immersion into a fluidized bed, spray application or in a roll application process. As a result of the process, it is possible by means of powder coating to apply only relatively thin layers to the metal, which are unsuitable for trenchless laying of pipelines. A disadvantage is especially that, for the coating, a powder of a relatively low molecular weight polyamide has to be used, in order to ensure a good flow of the melt on the hot metal surface. A coating thus obtained, however, has an insufficient mechanical strength; it serves primarily for corrosion protection. Another disadvantage is that, more particularly, it is not possible in this way to apply a polyamide layer to a pipe which already comprises a coating of a polyolefin or an adhesion promoter layer.

Furthermore, in addition, thermoset coatings based on epoxide or polyurethane are also known; they serve only for corrosion protection and do not constitute any protection against mechanical damage.

In the case of laying without a sand bed or in the case of trenchless laying, for example by means of ploughing, drilling or pressing methods, the corrosion protection applied according to the prior art is, however, not sufficiently mechanically durable. Impact or frictional stress during the laying damages the polymer layer in places to such an extent that the metal comes into contact with water. The corrosion which then sets in considerably reduces the service life of the pipeline. The same applies, for example, in the case of mechanical stress through the unintended impact of a digger shovel in the course of repair work in later operation. Pipelines with such corrosion protection coatings must be embedded in stone-free material. In the prior art, pipelines thus coated or encased are frequently protected from mechanical damage by an additionally applied cement mortar sheath.

The cement mortar layer is applied in a separate procedure. After the mortar layer has been applied, it must cure for at least five days before the tubes can be handled further. This step is thus very time-consuming and hence also costly. The state of the art regarding mortar sheathing can be found, for example, in the following documents: U.S. Pat. No. 5,580,659, DE 42 08 047 C1, DE 42 01 113 C1, DE 33 05 158 A1, U.S. Pat. No. 4,454,172 and U.S. Pat. No. 4,361,336. The German requirements on cement mortar sheathing are stated in DVGW (German Technical and Scientific Association for Gas and Water) worksheet GW 340. Such mortar layers, however, increase the weight of the tubes considerably; this complicates the handling. The weight-dependent loading capacity of the transport vehicles also decreases.

It is therefore an object of the invention to provide an encased metallic conduit which, even without additional protective measures, retains the integrity of the coating under mechanical stress, for example in the case of trenchless laying or laying without a sand bed, such that the metal tube is effectively protected from corrosion. In addition, firm adhesion to the tube or to any coatings present thereon should be achieved. Overall, a tube which is easy to handle and producible inexpensively should be provided.

These and further objects which are evident from the application documents are achieved by the use of a metallic conduit for producing an underground pipeline laid trenchlessly and/or without a sand bed, wherein the tube is encased with an extruded layer of a polyamide moulding material.

The term "underground" also includes the laying of the pipeline on the base of a water body, for example on the seabed.

The pipe consists, for example, of steel, stainless steel, copper, aluminium, cast iron, zinc-plated steel, steel coated with metal alloys, for example GALFAN, or of any other metal. The pipe can be produced by all prior art methods.

The polyamide is preparable from a combination of diamine and dicarboxylic acid, from an $\omega$-aminocarboxylic acid or the corresponding lactam. In principle, it is possible to use any polyamide, for example PA46, PA6, PA66, or copolyamides based on these with units which derive from terephthalic acid and/or isophthalic acid (generally known as PPA). In a preferred embodiment, the monomer units contain an average of at least 8, at least 9 or at least 10 carbon atoms. In the case of mixtures of lactams, the arithmetic mean is considered here. In the case of a combination of diamine and dicarboxylic acid, the arithmetic mean of the carbon atoms of diamine and dicarboxylic acid in this preferred embodiment must be at least 8, at least 9 or at least 10. Suitable polyamides are, for example: PA610 (preparable from hexamethylenediamine [6 carbon atoms] and sebacic acid [10 carbon atoms], the average of the carbon atoms in the monomer units here is thus 8), PA88 (preparable from octamethylenediamine and 1,8-octanedioic acid), PA8 (preparable from capryllactam), PA612, PA810, PA108, PA9, PA613, PA614, PA812, PA128, PA1010, PA10, PA814, PA148, PA1012, PA11, PA1014, PA1212 and PA12. The preparation of the polyamides is prior art. It will be appreciated that it is also possible to use copolyamides based thereon, in which case it is also possible if desired to use monomers such as caprolactam.

The polyamide may also be a polyetheresteramide or a polyetheramide. Polyetheramides are known in principle, for example, from DE-A 30 06 961. They contain, as a comonomer, a polyetherdiamine. Suitable polyetherdiamines are obtainable by conversion of the corresponding polyetherdiols by reductive amination or coupling to acrylonitrile with subsequent hydrogenation (for example EP-A-0 434 244; EP-A-0 296 852). They generally have a number-average molar mass of 230 to 4000; their proportion in the polyetheramide is preferably 5 to 50% by weight.

Commercially available polyetherdiamines proceeding from propylene glycol are commercially available as JEFFAMINE® D types from Huntsman. In principle, polyetherdiamines proceeding from 1,4-butanediol or 1,3-butanediol, or polyetherdiamines of mixed structure, for instance with random or with blockwise distribution of the units deriving from the diols, are also very suitable.

It is equally possible also to use mixtures of different polyamides, provided that they are sufficiently compatible. Compatible polyamide combinations are known to those skilled in the art; for example, the PA12/PA1012, PA12/PA1212, PA612/PA12, PA613/PA12, PA1014/PA12 and PA610/PA12 combinations are given here. In the case of doubt, compatible combinations can be determined by routing tests.

In a preferred embodiment, a mixture of 30 to 99% by weight, more preferably 40 to 98% by weight and especially preferably 50 to 96% by weight of polyamide in the narrower sense and 1 to 70% by weight, more preferably 2 to 60% by weight and especially preferably 4 to 50% by weight of polyetheresteramide and/or polyetheramide is used. Polyetheramides are preferred here.

As well as polyamide, the moulding material may comprise further components, for example impact modifiers, other thermoplastics, plasticizers and other customary additives. What is requires is only that the polyamide forms the matrix of the moulding material.

Suitable impact modifiers are, for example, ethylene/α-olefin copolymers, preferably selected from
- a) ethylene/$C_3$- to $C_{12}$-α-olefin copolymers with 20 to 96 and preferably 25 to 85% by weight of ethylene. The $C_3$- to $C_{12}$-α-olefin used is, for example, propene, 1-butene, 1-pentene, 1-hexene, 1-octene, 1-decene or 1-dodecene. Typical examples thereof are ethylene-propylene rubber, and also LLDPE and VLDPE.
- b) ethylene/$C_3$- to $C_{12}$-α-olefin/unconjugated diene terpolymers with 20 to 96 and preferably 25 to 85% by weight of ethylene and up to a maximum of about 10% by weight of an unconjugated diene such as bicyclo (2.2.1)heptadiene, hexadiene-1,4, dicyclopentadiene or 5-ethylidenenorbornene. Likewise suitable as $C_3$- to $C_{12}$-α-olefins are, for example, propene, 1-butene, 1-pentene, 1-hexene, 1-octene, 1-decene or 1-dodecene.

The preparation of these copolymers or terpolymers, for example with the aid of a Ziegler-Natta catalyst, is prior art.

Other suitable impact modifiers are styrene-ethylene/butylene block copolymers. In this case, preference is given to using styrene-ethylene/butylene-styrene block copolymers (SEBS) which are obtainable by hydrogenating styrene-butadiene-styrene block copolymers. It is also possible to use diblock systems (SEB) or multiblock systems. Such block copolymers are prior art.

These impact modifiers preferably contain acid anhydride groups which are introduced in a known manner by thermal or free-radical reaction of the main chain polymer with an unsaturated dicarboxylic anhydride, an unsaturated dicarboxylic acid or an unsaturated monoalkyl dicarboxylate in a concentration which is sufficient for good attachment to the polyamide. Suitable reagents are, for example, maleic acid, maleic anhydride, monobutyl maleate, fumaric acid, citraconic anhydride, aconitic acid or itaconic anhydride. In this way, preferably 0.1 to 4% by weight of an unsaturated anhydride are grafted onto the impact modifier. According to the prior art, the unsaturated dicarboxylic anhydride or precursor thereof can also be grafted on together with a further unsaturated monomer, for example styrene, α-methylstyrene or indene.

Other suitable impact modifiers are copolymers which contain units of the following monomers:
- a) from 20 to 94.5% by weight of one or more α-olefins having 2 to 12 carbon atoms,
- b) 5 to 79.5% by weight of one or more acrylic compounds selected from
  - acrylic acid or methacrylic acid or salts thereof,
  - esters of acrylic acid or methacrylic acid with a $C_1$ to $C_{12}$ alcohol which may optionally bear a free hydroxyl or epoxide function,
  - acrylonitrile or methacrylonitrile,
  - acrylamides or methacrylamides,
- c) 0.5 to 50% by weight of an olefinically unsaturated epoxide, carboxylic anhydride, carboximide, oxazoline or oxazinone.

This copolymer is, for example, composed of the following monomers, this list being nonexhaustive:
- a) α-olefins, such as ethylene, propene, 1-butene, 1-pentene, 1-hexene, 1-octene, 1-decene, or 1-dodecene;
- b) acrylic acid, methacrylic acid, or salts thereof, for example with $Na^\oplus$ or $Zn^{2\oplus}$ as counterions; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N, N-dimethylmethacrylamide, N-ethylmethacrylamide, N-hydroxyethylmethacrylamide, N-propylmethacrylamide, N-butylmethacrylamide, N,N-dibutylmethacrylamide, N-(2-ethylhexyl)methacrylamide;
- c) vinyloxirane, allyloxirane, glycidyl acrylate, glycidyl methacrylate, maleic anhydride, aconitic anhydride, itaconic anhydride, and the dicarboxylic acids produced from these anhydrides via reaction with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone, or isopropenyloxazinone.

In the case of use of glycidyl acrylate or glycidyl methacrylate, these simultaneously also function as the acrylic compound b), and so, in the case of a sufficient amount of the glycidyl (meth)acrylate, no further acrylic compounds need be present. In this specific embodiment, the copolymer contains units of the following monomers:
- a) 20 to 94.5% by weight of one more α-olefins having 2 to 12 carbon atoms,
- b) 0 to 79.5% by weight of one or more acrylic compounds selected from
  - acrylic acid and methacrylic acid and salts thereof,
  - esters of acrylic acid or methacrylic acid with a $C_1$-$C_{12}$ alcohol,
  - acrylonitrile or methacrylonitrile,
  - acrylamides or methacrylamides,
- c) 0.5 to 80% by weight of an ester of acrylic acid or methacrylic acid, where the ester contains an epoxy group, where the sum of b) and c) adds up to at least 5.5% by weight.

The copolymer may contain small amounts of further copolymerized monomers provided that they do not significantly impair the properties, for example dimethyl maleate, dibutyl fumarate, diethyl itaconate or styrene.

The preparation of such copolymers is prior art. A multitude of different types thereof are obtainable as commercial products, for example under the name LOTADER® (Arkema; ethylene/acrylate/ter component or ethylene/glycidyl methacrylate). In a preferred embodiment, the moulding material of the layer according to I. here comprises the following components:
1. 60 to 96.5 parts by weight of the polyamide,
2. 3 to 39.5 parts by weight of an impact modifier component which contains acid anhydride groups, the impact modifier component being selected from ethylene/α-olefin copolymers and styrene-ethylene/butylene block copolymers,
3. 0.5 to 20 parts by weight of a copolymer which contains units of the following monomers:
   a) 20 to 94.5% by weight of one or more α-olefins having 2 to 12 carbon atoms,
   b) 5 to 79.5% by weight of one or more acrylic compounds selected from
      acrylic acid or methacrylic acid or salts thereof,
      esters of acrylic acid or methacrylic acid with a $C_1$- to $C_{12}$-alcohol, where the esters may bear a free hydroxyl or epoxide function,
      acrylonitrile or methacrylonitrile,
      acrylamides or methacrylamides,
   c) 0.5 to 50% by weight of an olefinically unsaturated epoxide, carboxylic anhydride, carboximide, oxazoline or oxazinone,
where the sum of the parts by weight of the components according to 1., 2. and 3. is 100.

In a further preferred embodiment, the moulding material here comprises:
1. 65 to 90 parts by weight and more preferably 70 to 85 parts by weight of the polyamide,
2. 5 to 30 parts by weight, more preferably 6 to 25 parts by weight and especially preferably 7 to 20 parts by weight of the impact modifier component,
3. 0.6 to 15 parts by weight and more preferably 0.7 to 10 parts by weight of the copolymer, which preferably contains units of the following monomers:
   a) 30 to 80% by weight of α-olefin(s),
   b) 7 to 70% by weight and more preferably 10 to 60% by weight of the acrylic compound(s),
   c) 1 to 40% by weight and more preferably 5 to 30% by weight of the olefinically unsaturated epoxide, carboxylic anhydride, carboximide, oxazoline or oxazinone.

The impact modifier components used may additionally also be nitrile rubber (NBR) or hydrogenated nitrile rubber (H-NBR), which optionally contain functional groups. Corresponding moulding materials are described in US2003/0220449A1.

Other thermoplastics which may be present in the moulding material of the layer according to I. are primarily polyolefins. In one embodiment, as described above for the impact modifiers, they may contain acid anhydride groups and are then optionally present together with an unfunctionalized impact modifier. In a further embodiment, they are not functionalized and are present in the moulding material in combination with a functionalized impact modifier or a functionalized polyolefin. The term "functionalized" means that the polymers according to the prior art are provided with groups which can react with the polyamide end groups, for example acid anhydride groups, carboxyl groups, epoxide groups or oxazoline groups. Preference is given here to the following compositions:
1. 50 to 95% by weight of the polyamide,
2. 1 to 49 parts by weight of functionalized or unfunctionalized polyolefin and
3. 1 to 49 parts by weight of functionalized or unfunctionalized impact modifier,
where the sum of the parts by weight of the components according to 1., 2. and 3. is 100.

The polyolefin is, for example, polyethylene or polypropylene. In principle, it is possible to use any commercial type. Useful examples include: high, medium or low density linear polyethylene, LDPE, ethylene-acrylic ester copolymers, ethylene-vinyl acetate copolymers, isotactic or atactic homopolypropylene, random copolymers of propene with ethene and/or butene-1, ethylene-propylene block copolymers and the like. The polyolefin can be prepared by any known processes, for example according to Ziegler-Natta, by the Phillips process, by means of metallocenes or by free-radical means. The polyamide in this case may also, for example, be PA6 and/or PA66.

In one possible embodiment, the moulding material contains 1 to 25% by weight of plasticizer, more preferably 2 to 20% by weight and especially preferably 3 to 15% by weight.

Plasticizers and their use in polyamides are known. A general overview of plasticizers which are suitable for polyamides can be taken from Gächter/Müller, Kunststoffadditive [Plastics additives], C. Hanser Verlag, 2nd edition, p. 296.

Customary compounds suitable as plasticizers are, for example, esters of p-hydroxybenzoic acid having 2 to 20 carbon atoms in the alcohol component or amides of arylsulphonic acids having 2 to 12 carbon atoms in the amine component, preferably amides of benzenesulphonic acid. Useful plasticizers include ethyl p-hydroxybenzoate, octyl p-hydroxybenzoate, i-hexadecyl p-hydroxybenzoate, N-n-octyltoluenesulphonamide, N-n-butylbenzenesulphonamide or N-2-ethylhexylbenzenesulphonamide.

In addition, the moulding material may also comprise customary amounts of additives which are required to establish particular properties. Examples thereof are pigments and fillers such as carbon black, titanium dioxide, zinc sulphide, silicates or carbonates, reinforcing fibres, for example glass fibres, processing assistants such as waxes, zinc stearate or calcium stearate, flame retardants such as magnesium hydroxide, aluminium hydroxide or melamine cyanurate, antioxidants, UV stabilizers, and additives which impart antielectrostatic properties or electrical conductivity to the product, for example carbon fibres, graphite fibrils, fibres of stainless steel or conductive black.

A good mechanical durability of the polyamide coating is obtained especially when the viscosity of the polyamide moulding material at 240° C. and a shear rate of 0.1 l/s is at least 2000 Pa·s, preferably at least 2300 Pa·s, more preferably at least 3000 Pa·s, especially preferably at least 5000 Pa·s and most preferably at least 8000 Pa·s. The viscosity is determined in a cone-plate viscometer to ASTM D 4440-3.

A high viscosity of the polyamide moulding material is generally associated with a high molecular weight of the polyamide. One measure of the molecular weight of the polyamide is the solution viscosity. In the context of the invention, it is preferred that the relative solution viscosity $\eta_{rel}$ of the polyamide in the moulding material applied, measured in a 0.5% by weight solution in m-cresol at 23° C.

to ISO 307, is at least 1.8, more preferably at least 2.0, especially preferably at least 2.1 and most preferably at least 2.2.

A known process for preparing such polyamides is the solid phase postcondensation of granulated low-viscosity polyamides to give high-viscosity polyamide at a temperature lower than the melting point. The process is described, for example, in CH 359 286 and U.S. Pat. No. 3,821,171. Normally, the solid phase postcondensation of polyamides is carried out in a batchwise or continuous dryer under inert gas or reduced pressure. This method allows the preparation of polyamides with very high molecular weight.

Another means of preparing high-viscosity polyamides is continuous postcondensation in the melt using various types of screw apparatus. WO 2006/079890 specifies that high-viscosity polyamide moulding materials can be obtained by mixing a high molecular weight polyamide and a low molecular weight polyamide.

In addition, access to high-viscosity polyamides or polyamide moulding materials is possible through use of molecular weight-increasing additives; suitable additives and processes are described, for example, in the following documents: WO 98/47940, WO 96/34909, WO 01/66633, WO 03/066704, JP-A-01/197526, JP-A-01/236238, DE-B-24 58 733, EP-A-1 329 481, EP-A-1 518 901, EP-A-1 512 710, EP-A-1 690 889, EP-A-1 690 890 and WO 00/66650.

However, the moulding materials prepared according to this prior art generally require a very high power consumption and a very high torque, and the pressure at the nozzle is very high. Furthermore, at the high shear forces, perceptible chain cleavage occurs, which leads to a reduction in the molecular weight in the course of processing.

For these reasons, it is preferred in the context of the invention that the polyamide moulding material is not applied by condensation until during the processing operation with the aid of an additive which increases the molecular weight. The invention therefore also provides for the use of a pipe as claimed, wherein the extruded layer of the polyamide moulding material has been applied by means of the following process steps:

a) a polyamide moulding material was provided;
b) a premixture of the polyamide moulding material and of the molecular weight-increasing additive, for example a compound with at least two carbonate units, was prepared,
c) the mixture was, if appropriate, stored and/or transported and
d) the mixture was subsequently used for extrusion, and condensation was not effected until this step.

It has been found, in the case of this mode of addition during the processing, a significant increase in the melt stiffness occurs with simultaneously low motor load. Thus, in spite of high melt viscosity, high throughputs can be achieved in the course of processing, which results in an improvement in the economic viability of the preparation process. The process is described hereinafter by way of example for the case in which the molecular weight-increasing additive is a compound with at least two carbonate units.

The starting compounds preferably have molecular weights $M_n$ of greater than 5000, especially of greater than 8000. In this context, polyamides whose end groups are present at least partly as amino groups are used. For example, at least 30%, at least 40%, at least 50%, at least 60%, at least 70%, at least 80% or at least 90% of the end groups are present as amino end groups. The preparation of polyamides with higher amino end group content using diamines or polyamines as regulators is prior art. In the present case, in the preparation of the polyamide, preference is given to using an aliphatic, cycloaliphatic or aralphatic diamine having 4 to 44 carbon atoms as a regulator. Suitable diamines are, for example, hexamethylenediamine, decamethylenediamine, 2,2,4- or 2,4,4-trimethylhexamethylenediamine, dodecamethylenediamine, 1,4-diaminocyclohexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexylpropane, isophoronediamine, metaxylylenediamine or paraxylylenediamine.

In a further preferred embodiment, in the preparation of the polyamide, a polyamine is used as a regulator and simultaneously as a branching agent. Examples thereof are diethylenetriamine, 1,5-diamino-3-(β-aminoethyl)pentane, tris(2-aminoethyl)amine, N,N-bis(2-aminoethyl)-N',N'-bis[2-[bis(2-aminoethyl)amino]ethyl]1,2-ethanediamine, dendrimers and polyethyleneimines, especially branched polyethyleneimines which are obtainable by polymerizing aziridines (Houben-Weyl, Methoden der Organischen Chemie [Methods of Organic Chemistry, volume E20, pages 1482-1487, Georg Thieme Verlag Stuttgart, 1987) and which generally have the following amino group distribution:

25 to 46% primary amino groups,
30 to 45% secondary amino groups and
16 to 40% tertiary amino groups.

The compound with at least two carbonate units is used in a ratio of 0.005 to 10% by weight, calculated in relation to the polyamide used. This ratio is preferably in the range of 0.01 to 5.0% by weight, more preferably in the range of 0.05 to 3% by weight. The term "carbonate" here means esters of carbonic acid, especially with phenols or alcohols.

The compound with at least two carbonate units may be low in molecular weight, or be oligomeric or polymeric. It may consist completely of carbonate units or it may have further units. These are preferably oligo- or polyamide, oligo- or polyester, oligo- or polyether, oligo- or polyetheresteramide or oligo- or polyetheramide units. Such compounds can be prepared by known oligomerization or polymerization processes or by polymer-analogous reactions. In a preferred embodiment, the compound with at least two carbonate units is a polycarbonate, for example based on bisphenol A, or a block copolymer which contains such a polycarbonate block.

The metered addition of the compound with at least two carbonate units used as an additive in the form of a masterbatch enables more accurate metered addition of the additive, since larger amounts are used. It has additionally been found that the use of a masterbatch achieves an improved extrudate quality. The masterbatch comprises, as a matrix material, preferably the polyamide which is also applied by condensation in the process according to the invention, or a polyamide compatible therewith, but it is also possible for incompatible polyamides, under the reaction conditions, to undergo partial attachment to the polyamide to be applied by condensation, which brings about compatibilization. The polyamide used as the matrix material in the masterbatch preferably has a molecular weight $M_n$ of greater than 5000 and especially of greater than 8000. Preference is given here to those polyamides whose end groups are present predominantly as carboxylic acid groups. For example, at least 80%, at least 90% or at least 95% of the end groups are present as acid groups.

The concentration of the compound with at least two carbonate units in the masterbatch is preferably 0.15 to 50% by weight, more preferably 0.2 to 25% by weight and especially preferably 0.3 to 15% by weight. Such a masterbatch is prepared in the customary manner known to those skilled in the art.

Suitable compounds with at least two carbonate units and suitable masterbatches are described in detail in WO 00/66650, which is explicitly incorporated by reference here.

The invention is employable in the case of polyamides which, as a result of the preparation, contain at least 5 ppm of phosphorus in the form of an acidic compound. In this case, 0.001 to 10% by weight, based on the polyamide, of a salt of a weak acid is added to the polyamide moulding material before the compounding or in the course of compounding. Suitable salts are disclosed in DE-A 103 37 707, which is hereby explicitly incorporated by reference.

However, the invention is equally employable in the case of polyamides which, as a result of the preparation, contain less than 5 ppm of phosphorus or no phosphorus at all in the form of an acidic compound. In this case, it is possible but not obligatory for an appropriate salt of a weak acid to be added.

The compound with at least two carbonate units is added as such or as a masterbatch preferably only after the compounding, i.e. after the preparation of the polyamide moulding material, but no later than during processing. In the course of processing, preference is given to mixing the polyamide to be applied by condensation or the polyamide moulding material to be applied by condensation as a granule with the granule or powder of the compound with at least two carbonate units or the corresponding masterbatch. However, it is also possible to prepare a granule mixture of the ready-compounded polyamide moulding material with the compounds with at least two carbonate units or the masterbatch, then to transport or store it and then to process it. It is of course also possible to proceed correspondingly with powder mixtures. What is crucial is that the mixture is not melted until the processing stage. Thorough mixing of the melt at the processing stage is advisable. However, the masterbatch can also equally efficiently be metered into the melt of the polyamide moulding material to be processed as a melt stream with the aid of an extruder provided and then mixed in thoroughly.

Instead of the compound with at least two carbonate units, it is also possible to use any other suitable molecular weight-increasing additive, for example one which is disclosed in the literature cited above.

Suitable ratios here too are 0.005 to 10% by weight, calculated in relation to the polyamide used, preferably 0.01 to 5.0% by weight, more preferably 0.05 to 3% by weight.

The polyamide layer applied must at least be sufficiently thick that it can be obtained as a continuous layer under the conditions of application. The layer thickness is preferably at least 1.0 mm, more preferably at least 1.2 mm and especially preferably at least 1.4 mm.

The polyamide layer can be applied directly on the metal surface. In general, though, there is at least one further layer between the metal surface and the polyamide layer. For example, the layers may be the following layers:
- a ceramic layer, for example according to WO 03/093374;
- a primer layer, for example of epoxy resin (U.S. Pat. No. 5,580,659) or of a water-based mixture of epoxy resin and polyacrylate latex (WO 00/04106);
- a layer of a polyolefin which bears functional groups. Useful functional groups include, for example, carboxyl groups or acid anhydride groups (WO 02/094922), epoxy groups or alkoxysilane groups (EP-A-0 346 101). The polyolefin layer may also be foamed. The polyolefin is preferably polyethylene or polypropylene;
- an adhesion promoter of different composition, which is intended to ensure that, in the event of mechanical stress, the bond of polyamide layer and base material is not impaired;
- a textile reinforcement in the form of fabric or mats, for example of glass fibres or Aramid fibres (Kevlar).

Preferred layer arrangements are as follows:
metal/ceramic layer/polyamide layer;
metal/ceramic layer/primer layer/polyamide layer;
metal/ceramic layer/primer layer/adhesion promoter/polyamide layer;
metal/primer layer/polyamide layer;
metal/primer layer/adhesion promoter/polyamide layer;
metal/primer layer/polyolefin layer/polyamide layer.

In each of these cases, the polyamide layer may be adjoined on the outside by at least one further layer, for example a foam sheath for thermal insulation.

Any ceramic layer, primer layer or polyolefin layer is applied to the pipe by any desired method. Suitable methods are prior art.

The polyamide layer is applied as is also prior art for the polyolefin layer, for example by means of pipe extrusion or winding extrusion. In one possible variant, the polyamide layer can be obtained and applied together with a polyolefin layer which is likewise to be applied by coextruding a multilayer composite.

The external diameter of the metal tube is preferably at least 25 mm and not more than 4800 mm and more preferably at least 32 mm and not more than 2500 or 1500 mm.

The individual pieces of the tube are connected to form a pipeline as required.

The pipeline in question may be a transport line, a distribution line or a house connection line, and can be configured either as a pressurized line or as an open-channel line. It serves, for example, to transport heat in district heating systems, freshwater, wastewater, gas, air, oils, for example crude oil, light oil or heavy oil, fuels, for example kerosene or diesel, petrochemicals, brine, alkalis, abrasive media, mining or injection materials or dusts, and may, for example, be a supply line or waste disposal line.

The pipeline is laid trenchlessly and/or without a sand bed by known methods. Examples thereof are horizontal directional drilling, burst lining, ploughing, cutting and microtunnelling.

Horizontal directional drilling (HDD) is a trenchless pipeline building method in which a controlled pilot bore is first driven over the distance to be bored. Subsequently, it is widened in one or more operations. Thereafter, the pipeline section to be introduced is drawn into the bored channel from the destination trench. The HDD method is used, for example, in the case of river crossings, crossings of fortified areas, bringing pipes onshore in coastal regions or mountain crossings. The prior art currently allows bore lengths up to 3000 m. The method is described, for example, in the DVGW-Regelwerk [Rules and Standards] by worksheet GW 321.

Burst lining is a trenchless process for pipe renewal, in which the old pipeline route is used. The old pipeline is destroyed and the new pipeline is drawn into the existing route. After the rod system has been inserted into the old pipeline, the bursting head or the rolling cutting blade is attached in order to destroy the old pipeline. A widening body arranged behind it widens the route to the desired diameter. An increase in the original nominal width is possible. The new pipeline is simultaneously drawn in with the bursting and widening head. Burst lining is described in information sheet RSV 8 of the Rohrsanierungsverband e. V. [German Pipe Renewal Association].

In the case of ploughing, the plough's blade cuts a laying trench in the soil. Displacer elements force the soil apart. In the same step, the pipe is introduced into the trench. The pipe trench is then immediately closed again. In this method, the laying depth is limited to about 2 meters.

In cutting, a special machine is used to cut a narrow pipe trench into which the pipe is introduced in the same operation. The soil extracted is used as filling material. The cut can be inserted up to a laying depth of about 2 meters. For ploughing and cutting, a DVGW Worksheet is currently being prepared (GW 324).

Microtunnelling is understood to mean a remote-controlled method of driving pipes, in which, proceeding from a start shaft (pressing trench), a sewer pipe is driven by means of a driving machine with a press and boring head. The soil is removed by means of a hydraulically driven boring head. For reduction of friction and for short-term support of the soil to prevent collapse, a conveying medium (bentonite fluid in the case of loose, non-cohesive soil; water is adequate in cohesive or rocky soil) is sprayed in at the boring head. The material excavated is conveyed by means of conveying screws and lines which run within the already inserted tube into the pressing trench and from there upward (to ground level). Here, soil and conveying medium are separated. The conveying medium is then reused.

For further information, reference is made to IRB literature documentation 3366, "Grabenlose Rohrverlegung" [Trenchless Pipe Laying] (publisher: Fraunhofer-Informationszentrum Raum und Bau IRB, Stuttgart), ISBN 978-3-8167-3291-4, Fraunhofer IRB Verlag.

Owing to the high mechanical strength, the good abrasion properties, the very high scratch resistance and the optimal thickness of the polyamide layer applied, it is possible in accordance with the invention to simultaneously ensure good corrosion protection and the durability of the outer shell required for trenchless laying techniques and those without sand beds.

The invention claimed is:

1. A method of producing an underground pipeline, comprising:
    encasing a metal conduit with an extruded layer of a polyamide molding material, wherein the metal conduit is optionally a metal tube; and
    laying the metal conduit encased with an extruded layer of a polyamide underground trenchlessly and/or without a sand bed by burst lining, ploughing, cutting or microtunnelling,
    wherein the extruded layer of the polyamide has a thickness of at least 1 mm, and
    wherein the polyamide in the extruded molding material has a relative solution viscosity $\eta_{rel}$ according to ISO 307 of at least 1.8.

2. The method according to claim 1, wherein between the metal tube and the layer of the polyamide molding material, one or more further layers are present, wherein the layers comprise at least one of
    a ceramic layer,
    a primer layer and
    a layer of a polyolefin which comprises a functional group.

3. The method according to claim 1, wherein an external diameter of the metal conduit is at least 25 mm and at most 4800 mm.

4. The method according to claim 1, wherein a viscosity of the extruded polyamide molding material at 240° C. and a shear rate of 0.1 l/s according to ASTM D 4440-3 is at least 2000 Pa·s.

5. The method according to claim 1, further comprising:
    a) providing a polyamide molding material;
    b) preparing a premixture of the polyamide molding material and a molecular weight-increasing additive,
    c) storing and transporting the mixture and
    d) applying the mixture during extrusion to form an extruded layer wherein condensation is not effected.

6. The method according to claim 5, wherein the molecular weight-increasing additive is a compound having at least two carbonate units.

7. The method according to claim 1, wherein the metal conduit is a metal tube.

8. The method according to claim 1, wherein the extruded layer of the polyamide has a thickness of at least 1.2 mm.

9. The method according to claim 1, wherein the extruded layer of the polyamide has a thickness of at least 1.4 mm.

10. The method according to claim 1, wherein the metal conduit is laid trenchlessly.

11. The method according to claim 1, wherein the metal conduit is laid without a sand bed.

12. The method according to claim 1, wherein the metal conduit is laid trenchlessly without a sand bed.

13. The method according to claim 1, wherein the extruded molding material has a relative solution viscosity $\eta_{rel}$ according to ISO 307 of at least 2.0.

14. The method according to claim 1, wherein the extruded molding material has a relative solution viscosity $\eta_{rel}$ according to ISO 307 of at least 2.1.

15. The method according to claim 1, wherein the extruded molding material has a relative solution viscosity $\eta_{rel}$ according to ISO 307 of at least 2.2.

16. The method according to claim 1, wherein the polyamide molding material further comprises an impact modifier.

17. The method according to claim 1, wherein the polyamide molding material comprises 30 to 99% by weight of a polyamide and 1 to 70% by weight of at least one of a polyetheresteramide and a polyetheramide.

18. A method of producing an underground pipeline, comprising:
    encasing a metal conduit with an extruded layer of a polyamide molding material, wherein the metal conduit is optionally a metal tube; and
    laying the metal conduit encased with an extruded layer of a polyamide underground trenchlessly,
    wherein the extruded layer of the polyamide has a thickness of at least 1 mm, and
    wherein the polyamide in the extruded molding material has a relative solution viscosity $\eta_{rel}$ according to ISO 307 of at least 1.8.

19. The method according to claim 18, which comprises laying the metal conduit encased with an extruded layer of a polyamide underground trenchlessly by horizontal directional drilling, burst lining, ploughing, cutting or microtunnelling.

20. The method according to claim 18, wherein the polyamide molding material comprises 30 to 99% by weight of a polyamide and 1 to 70% by weight of at least one of a polyetheresteramide and a polyetheramide.

21. A method of producing an underground pipeline, comprising:

encasing a metal conduit with an extruded layer of a polyamide molding material, wherein the metal conduit is optionally a metal tube; and laying the metal conduit encased with an extruded layer of a polyamide underground trenchlessly and/or without a sand bed, wherein the extruded layer of the polyamide has a thickness of at least 1 mm, wherein the polyamide in the extruded molding material has a relative solution viscosity $\eta_{rel}$ according to ISO 307 of at least 1.8, and wherein the polyamide molding material comprises 30 to 99% by weight of a polyamide and 1 to 70% by weight of at least one of a polyetheresteramide and a polyetheramide.

22. The method according to claim 21, wherein the polyamide molding material comprises 40 to 98% by weight of a polyamide and 2 to 60% by weight of at least one of a polyetheresteramide and a polyetheramide.

23. The method according to claim 21, wherein the polyamide molding material comprises 50 to 96% by weight of a polyamide and 4 to 50% by weight of at least one of a polyetheresteramide and a polyetheramide.

24. The method according to claim 21, wherein the polyamide molding material comprises 30 to 99% by weight of a polyamide and 1 to 70% by weight of a polyetheramide.

25. The method according to claim 21, wherein the polyamide molding material further comprises an impact modifier.

26. The method according to claim 21, which comprises laying the metal conduit encased with an extruded layer of a polyamide underground trenchlessly and/or without a sand bed by horizontal directional drilling, burst lining, ploughing, cutting or microtunnelling.

* * * * *